United States Patent
Yumoto et al.

(10) Patent No.: US 8,652,021 B2
(45) Date of Patent: Feb. 18, 2014

(54) DECANTER-TYPE CENTRIFUGAL SEPARATOR EQUIPPED WITH CONTINUOUS LUBRICANT SUPPLY DEVICE INCLUDING AN OIL COLLECTOR CONFIGURED TO REVOLVE IN A PREDETERMINED DIRECTION CAUSING THE LUBRICANT TO FLOW INTO THE LUBRICANT SUPPLY PATH

(75) Inventors: Takeo Yumoto, Fujisawa (JP); Toshio Tagami, Atsugi (JP)

(73) Assignee: Tomoe Engineering Co., Ltd., Tokyo (JP)

( * ) Notice: Subject to any disclaimer, the term of this patent is extended or adjusted under 35 U.S.C. 154(b) by 0 days.

(21) Appl. No.: 13/817,403

(22) PCT Filed: Aug. 17, 2010

(86) PCT No.: PCT/JP2010/063882
§ 371 (c)(1),
(2), (4) Date: Apr. 3, 2013

(87) PCT Pub. No.: WO2012/023181
PCT Pub. Date: Feb. 23, 2012

(65) Prior Publication Data
US 2013/0190160 A1    Jul. 25, 2013

(51) Int. Cl.
*B04B 1/20*    (2006.01)
*B04B 9/12*    (2006.01)
(52) U.S. Cl.
USPC ............... 494/15; 494/41; 494/53; 184/6
(58) Field of Classification Search
USPC ......... 494/7–9, 14, 15, 52–54, 83, 84, 38–41; 184/6.1, 6.12, 6; 210/380.1, 380.3
See application file for complete search history.

(56) References Cited

U.S. PATENT DOCUMENTS 3,285,506 A * 11/1966 Reed ............................... 494/15
3,315,882 A *  4/1967 Reed ............................... 494/15

(Continued)

FOREIGN PATENT DOCUMENTS

JP    62-114669 A    5/1987
JP    2-290267 A    11/1990

(Continued)

OTHER PUBLICATIONS

International Search Report (ISR) dated May 24, 2011 (and English translation thereof) issued in parent International Application No. PCT/JP2010/063882.

*Primary Examiner* — Charles E Cooley
(74) *Attorney, Agent, or Firm* — Holtz, Holtz, Goodman & Chick (57) ABSTRACT

A decanter-type centrifugal separator equipped with a continuous lubricant supply device capable of preventing leakage of lubricating oil along supply pathways, and supplying and discharging lubricating oil. The continuous lubricant supply device has a lubricating oil supply channel formed inside a bowl hub, an annular introduction channel that introduces lubricating oil into the lubricating oil supply channel, a lubricating oil infusion channel formed inside a holder, and an oil collector installed on an outer surface of an outer shaft. The annular introduction channel has a first annular groove formed inside the holder such that the groove is occluded on the inside by the outer surface of the outer shaft. The oil collector can orbitally revolve in a predetermined direction inside the annular introduction channel, thereby moving lubricating oil radially inward in the annular introduction channel so as to flow into the lubricating oil supply channel.

24 Claims, 5 Drawing Sheets

(56) References Cited

U.S. PATENT DOCUMENTS

| | | | |
|---|---|---|---|
| 4,708,711 A * | 11/1987 | Scherer | 494/41 |
| 5,364,335 A * | 11/1994 | Franzen et al. | 494/15 |
| 5,553,867 A | 9/1996 | Rockwood | |
| 5,727,792 A | 3/1998 | Rockwood | |
| 6,981,940 B2 * | 1/2006 | Rafferty | 494/7 |
| 7,500,311 B2 * | 3/2009 | Shimomura | 29/898.1 |
| 8,302,737 B2 * | 11/2012 | Yanohara et al. | 184/7.4 |
| 8,444,542 B2 * | 5/2013 | Ostkamp et al. | 494/14 |
| 2011/0034312 A1 * | 2/2011 | Ostkamp et al. | 494/14 |
| 2013/0190160 A1 * | 7/2013 | Yumoto et al. | 494/15 |

FOREIGN PATENT DOCUMENTS

| | | | |
|---|---|---|---|
| JP | 11-037070 A | 2/1999 | |
| JP | 2002-273268 A | 9/2002 | |
| JP | 2002273268 A * | 9/2002 | B04B 1/20 |
| WO | 2012/023181 A1 * | 2/2012 | |

* cited by examiner

Prior Art

DECANTER-TYPE CENTRIFUGAL SEPARATOR EQUIPPED WITH CONTINUOUS LUBRICANT SUPPLY DEVICE INCLUDING AN OIL COLLECTOR CONFIGURED TO REVOLVE IN A PREDETERMINED DIRECTION CAUSING THE LUBRICANT TO FLOW INTO THE LUBRICANT SUPPLY PATH

TECHNICAL FIELD

The present invention relates to a decanter-type centrifugal separator that separates raw liquid to be processed into supernatant and solid fraction, and more particularly to a decanter-type centrifugal separator equipped with a continuous lubricant supply device that continuously supplies lubricant such as grease to bearings of a screw conveyor disposed in a bowl of the decanter-type centrifugal separator.

BACKGROUND ART

Figure 6:
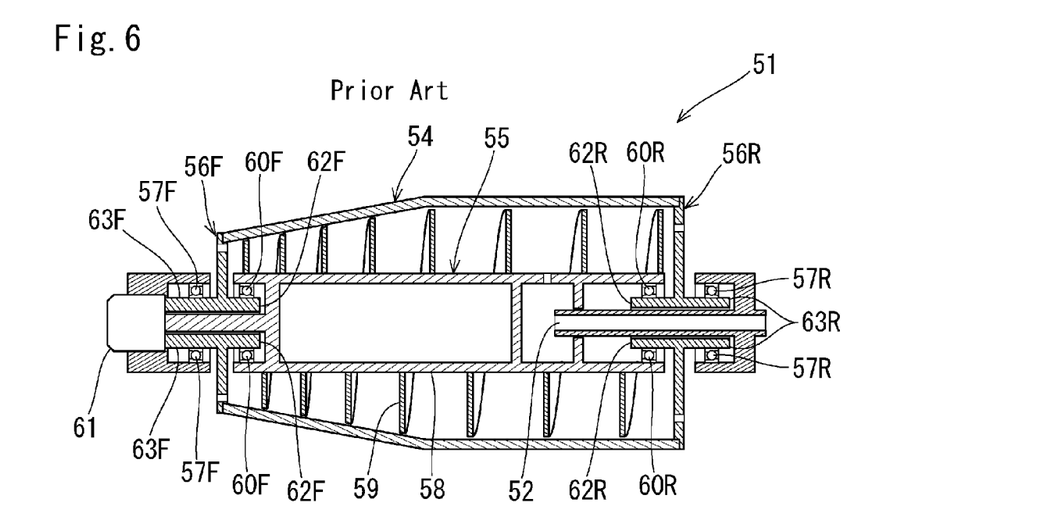
FIG. 6 is a cross-sectional view of the conventional decanter-type centrifugal separator 51.

As shown in FIG. 6, a decanter-type centrifugal separator 51 has a hollow bowl 54 and a screw conveyor 55 disposed inside the bowl 54 coaxially therewith. The separator 51 is configured such that where the bowl 54 and the screw conveyor 55 are rotated at a high speed, raw liquid to be processed that is introduced from a supply pipe 52 for raw liquid to be processed into the bowl 54 is separated by a centrifugal force and the separated fractions are discharged separately from each other.

More specifically, bowl hubs 56F, 56R installed at both ends of the bowl 54 are supported by bearings (bowl hub bearings 57F, 57R) that are fixed at the outer circumferential side, and the bowl is configured to rotate at a high speed upon receiving a rotational drive force from a drive means (not shown in the figure).

Meanwhile, the screw conveyor 55 is constituted by a conveyor hub 58 and a spiral flight 59 attached to the outer circumferential surface thereof. The two ends of the conveyor hub 58 are supported by conveyor hub bearings 60F, 60R, and the screw conveyor 55 is configured to be rotated at a speed different from that of the bowl 54 by a rotational drive force transmitted from a drive means via a differential gear 61. The conveyor hub bearings 60F, 60R supporting the screw conveyor 55 are disposed between the outer circumferential surfaces of the inner shafts 62F, 62R of the bowl hubs 56F, 56R that protrude into the bowl 54 and the inner circumferential surface of the conveyor hub 58 positioned radially outside thereof.

Ball bearings in which a plurality of balls is held between a track ring on the outer circumferential side and a track ring on the inner circumferential side are most often used as the bowl hub bearings 57F, 57R and the conveyor hub bearings 60F, 60R, and like other bearings (roller bearings or sliding bearings), they require lubricant (grease or the like) to be supplied therein after each predetermined period (for example, 3 months).

Since the bowl hub bearings 57F, 57R are disposed outside the bowl 54, as shown in the figure, a path for supplying the lubricant to the bowl hub bearings 57F, 57R is easily ensured, regardless of whether or not the separator is operated (the bowl 54 and the screw conveyor 55 rotate). Meanwhile, since the conveyor hub bearings 60F, 60R are disposed inside the bowl 54, it is very difficult to ensure a path by which the lubricant can be supplied to the conveyor hub bearings 60F, 60R during the operation.

Therefore, in the conventional decanter-type centrifugal separator 51 such as shown in FIG. 6, when the lubricant is supplied to the conveyor hub bearings 60F, 60R, it is necessary to stop the operation temporarily, stop the rotation of the bowl 54 and the screw conveyor 55, and then supply the lubricant.

PRIOR ART DOCUMENTS

Patent Document 1: Japanese Patent Publication No. 2002-273268

SUMMARY OF THE INVENTION

Problems to be Solved by the Invention

However, a certain time is required to stop and then restart the decanter-type centrifugal separator 51 of such kind. Furthermore, when the separator 51 is temporarily stopped, it is necessary to remove the solid matter remaining inside the bowl 54 and then clean up the bowl 54 and the screw conveyor 55 before the separator 51 is restarted. As a result, the processing volume or production volume is greatly reduced by comparison with the continuous operation.

A conventional decanter-type centrifugal separator configured such that lubricant can be supplied to the conveyor hub bearings, without stopping the operation has also been suggested (decanter-type centrifugal separator described in Japanese Patent Application Publication No. 2002-273268). In this decanter-type centrifugal separator, even when the bowl and screw conveyor (screw 2) are rotated, lubricant can be supplied from the oiling hole (17) of the holder supporting a bowl hub bearing (main bearing 9) to the conveyor hub bearings (screw bearing 15) via an annular groove (circumferential groove 18) formed in the outer circumferential surface of a bowl hub (bowl shaft 4) and a lubricant supply path (oiling path 19 of the bowl shaft) formed inside the bowl hub (bowl shaft 4). However, a problem associated with this decanter-type centrifugal separator is that the lubricant injected from the oiling hole (17) of the holder leaks from a gap between the holder (16) and the bowl hub (bowl shaft 4).

More specifically, in order to ensure a state in which a cavity open at the inner circumferential surface of a cylindrical member in a stationary state and a cavity formed inside a shaft member rotating inside thereof communicate at all times, it is necessary to form an annular groove in the inner circumferential surface of the cylindrical member or in the outer circumferential surface of the shaft member. In the case in which the annular groove is formed in the inner circumferential surface of the cylindrical member, where the opening of the cavity of the shaft member is formed at a position close to the annular groove in the outer circumferential surface of the shaft member located inside the cylindrical member, and in the case in which the annular groove is formed in the outer circumferential surface of the shaft member, where the opening of the cavity of the cylindrical member is formed at a position close to the annular groove in the inner circumferential surface of the cylindrical member located outside the shaft member, those cavities can be in a state of communication at all times during the rotation of the shaft member.

In the decanter-type centrifugal separator described in Japanese Patent Application Publication No. 2002-273268, the circumferential groove (18) is formed in the outer circumferential surface of the bowl shaft (4) and the oiling hole (17) of the holder is configured to be open at a position close to the circumferential groove (18) in the inner circumferential surface of the holder (16) so that the oiling hole (17) of the holder in a stationary state and the oiling path (19) formed inside the shaft (4) of the rotating bowl communicate with each other at all times.

Since the bowl shaft (4) located inside the holder (16) is rotatably supported with respect to the holder in a stationary state, a gap is present between the inner circumferential surface of the holder (16) and the outer circumferential surface of the bowl shaft (4). Two seal rings (22) are attached at both sides of the circumferential groove (18) to the outer circumferential surface of the bowl shaft (4) with the object of preventing the lubricant from leaking from this gap. However, since those seal rings (22) are made from steel and are of a non-contact type, a gap, although a very small one, is still present between the outer circumferential edge of the seal rings and the inner circumferential surface of the holder (16).

Since the bowl shaft (4) of such a decanter-type centrifugal separator rotates at a high speed, a centrifugal force acts upon the lubricant that has flown into the circumferential groove (18). Therefore, in order to cause the lubricant to flow from the space inside the circumferential groove (18) into the oiling path (19) present at a position closer to the central axial line than the circumferential groove, it is necessary to pump the lubricant by a force larger than this centrifugal force and acting thereagainst. For this reason, the lubricant should be supplied into the circumferential groove (18) by a correspondingly high pressure. Where the pressure at which the lubricant is supplied is increased, the lubricant located inside the circumferential groove (18) is highly probable to leak from the gap between the seal rings (22) and the inner circumferential surface of the holder (16).

The usage of contact seal rings can be considered as a means for completely preventing such leak of the lubricant, but when contact seal rings are used in mechanisms rotating at a high speed, such as the decanter-type centrifugal separator, heat generation caused by friction can become a problem.

The present invention has been created to resolve the above-described problems inherent to the related art and to provide a decanter-type centrifugal separator equipped with a continuous lubricant supply device in which leak of lubricant in a supply path can be advantageously avoided and the lubricant can be stably supplied and discharged.

Means for Solving the Problems

The present invention provides decanter-type centrifugal separator including: a hollow bowl; a bowl hub supporting the bowl and constituted by a flange, an inner shaft, and an outer shaft; a holder supporting in a rotatable state the outer shaft of the bowl hub inserted inside the holder; and a screw conveyor supported by a conveyor hub bearing in a rotatable state at an outer circumferential side of the inner shaft of the bowl hub, and configured such that raw liquid to be processed that has been introduced into the bowl is separated by a centrifugal force and separated fractions are discharged separately as a result of rotating the aforementioned components at a high speed, wherein the decanter-type centrifugal separator further includes a continuous lubricant supply device having: a lubricant supply path formed inside the bowl hub to supply a lubricant continuously to the conveyor hub bearing; an annular introducing path for introducing the lubricant into the lubricant supply path; a lubricant injection path formed inside the holder so that the lubricant can be injected from the outside of the holder into the annular introducing path; and an oil collector attached to an outer circumferential surface of the outer shaft, the annular introducing path is constituted by a first annular groove formed inside the holder radially outward from an inner circumferential surface thereof and an outer circumferential surface of the outer shaft that closes the first annular groove from the inner side, and the oil collector is configured to revolve in a predetermined direction along a trajectory inside the annular introducing path, move the lubricant located inside the annular introducing path radially inward in this process, and cause the lubricant to flow into the lubricant supply path.

The annular introducing path can be also constituted by a first annular groove formed radially inward from an outer circumferential surface of the outer shaft and an outer circumferential surface of the holder closing the first annular groove from the outer side. Further, in the decanter-type centrifugal separator, it is preferred that contact-type heat-resistant oil seals (which are attached closely and fixed over the entire circumference to the holder and have respective lip sections that are in contact over the entire circumference with the outer shaft, or which are attached closely and fixed over the entire circumference to the outer shaft and have respective lip sections that are in contact over the entire circumference with the holder) be disposed at both sides of the first annular groove, and a gap between the inner circumferential surface of the holder and the outer circumferential surface of the outer shaft of the bowl hub be closed by those heat-resistant oil seals.

It is also preferred that the oil collector be constituted by a base section, a center flap, and two side flaps; the base section be fixed to the outer circumferential surface of the outer shaft of the bowl hub; the center flap be fixed in a state such that a distal end section thereof is tilted forward in a rotation direction of the outer shaft and covers the top of an opening of the lubricant supply path at the outer shaft side from a rear side in the rotation direction; the side flaps be attached to two respective sides of the center flap and fixed in a state such as to surround the opening of the lubricant supply path at the outer shaft side from the sides; and the two side flaps be configured such that the distance therebetween increases gradually forward in the rotation direction of the outer shaft.

Further, it is preferred that the continuous lubricant supply device have a lubricant discharge path formed inside the bowl hub to discharge the lubricant supplied to the conveyor hub bearing, an annular collection section for collecting and discharging the lubricant released from the lubricant discharge path, and a lubricant outflow path formed inside the holder so as to enable the discharge of the lubricant from the lubricant collection section to the outside of the holder, wherein the annular collection section is constituted by a second annular groove formed inside the holder radially outward from the inner circumferential surface thereof and the outer circumferential surface of the outer shaft that closes the second annular groove from the inside, or the annular collection section is constituted by a second annular groove formed radially inward from the outer circumferential surface of the outer shaft and the outer circumferential surface of the holder that closes the second annular groove from the outside.

In this case, it is preferred that contact-type heat-resistant oil seals (oil seals which are attached closely and fixed over the entire circumference to the holder and have respective lip sections that are in contact over the entire circumference with the outer shaft, or oil seals which are attached closely and fixed over the entire circumference to the outer shaft and have respective lip sections that are in contact over the entire circumference with the holder) be disposed at both sides of the second annular groove, and a gap between the inner circumferential surface of the holder and the outer circumferential surface of the outer shaft of the bowl hub be closed by those heat-resistant oil seals.

It is also preferred that the lubricant supply path be constituted by a first vertical orifice formed in the outer shaft of the bowl hub, a second vertical orifice formed in the inner shaft, and a transverse orifice communicating a bottom of the first vertical orifice with a bottom of the second vertical orifice, wherein the transverse orifice of the lubricant supply path is formed such that a final end side is tilted radially outward with respect to the starting end side.

It is also preferred that the lubricant discharge path be constituted by a first vertical orifice formed in the outer shaft of the bowl hub, a second vertical orifice formed in the inner shaft, and a transverse orifice communicating a bottom of the first vertical orifice with a bottom of the second vertical orifice, wherein the transverse orifice of the lubricant discharge path is formed such that a final end side is tilted radially outward with respect to the starting end side.

Further, in the decanter-type centrifugal separator, it is preferred that a lubricant supply means and an air supply means be connected to the lubricant injection path, and air be caused to flow down in the lubricant injection path and the annular introducing path.

Effects of the Invention

In the decanter-type centrifugal separator in accordance with the present invention, the lubricant can be continuously and stably supplied to the conveyor hub bearing without stopping the operation, that is, while the bowl and the screw conveyor rotate at a high speed. In particular, even when grease with low flowability is used as the lubricant, the lubricant can be supplied stably and continuously without any problem. Further, the lubricant can be reliably prevented from leaking in the lubricant supply route and discharge route, since the lubricant located inside the annular introducing path can be smoothly introduced into the lubricant supply path by the oil collector revolving inside the annular introducing path, and therefore it is not necessary to increase a lubricant supply pressure, and since contact-type seal rings are used as the oil seals between the outer shaft of the rotating bowl hub and the stationary holder.

Further, when a contact-type oil seal is used for a bowl hub rotating at a high speed, friction heat can become a problem. However, in the decanter-type centrifugal separator in accordance with the present invention, this problem can be advantageously resolved by causing air to flow down the lubricant supply route and discharge route.

EMBODIMENT FOR CARRYING OUT THE INVENTION

Figure 1:
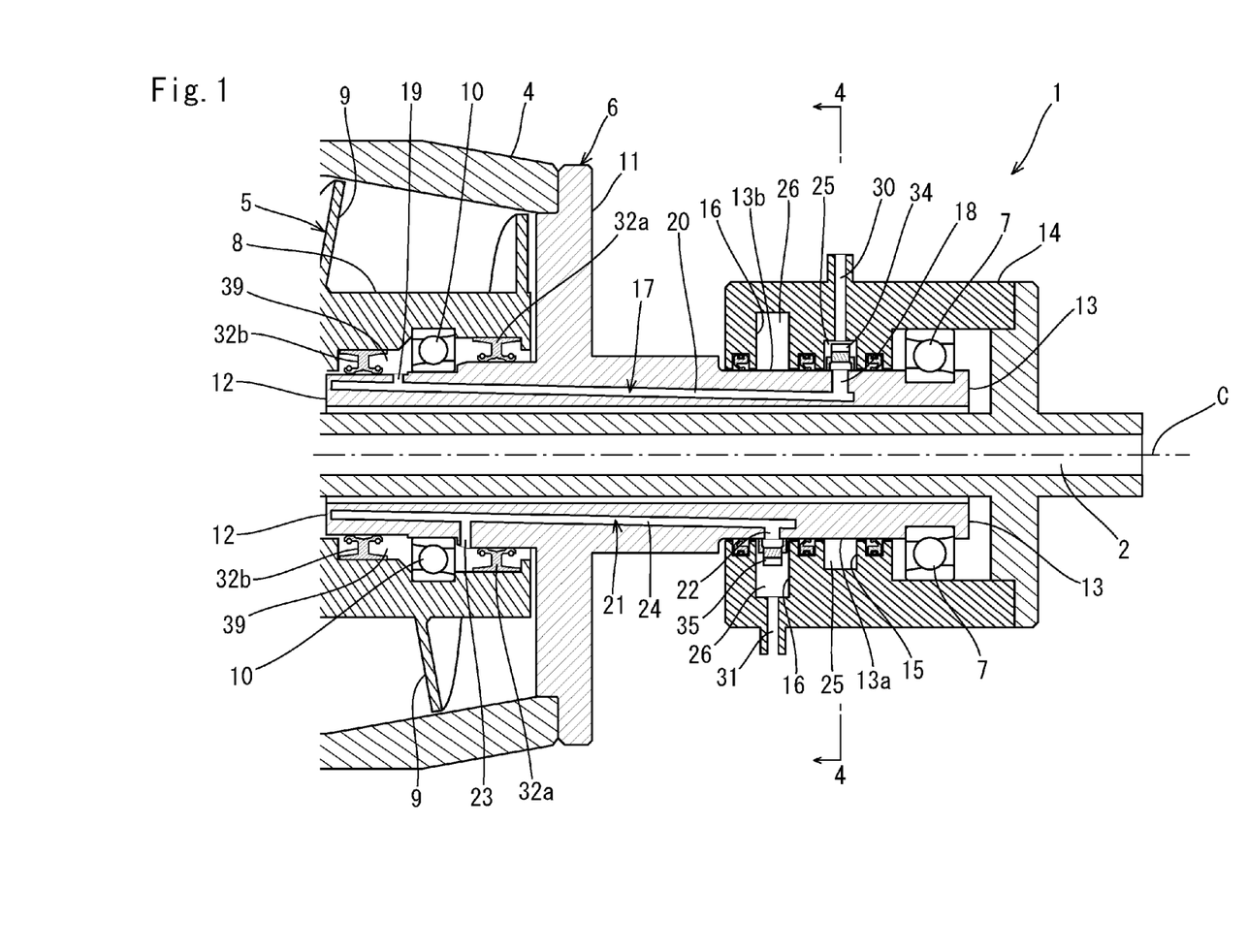
FIG. 1 is a partially enlarged cross-sectional view of a decanter-type centrifugal separator 1 in accordance with the present invention.

An embodiment of the "decanter-type centrifugal separator" in accordance with the present invention will be explained below. FIG. 1 is a partially enlarged cross-sectional view of a decanter-type centrifugal separator 1 in accordance with the present invention. This figure illustrates the cross-sectional structure of a bowl hub 6 attached to the rear-side end section of a bowl 4 and peripheral components thereof.

As shown in the figure, the bowl hub 6 is constituted by a flange 11 supporting the bowl 4, a cylindrical inner shaft 12 protruding in the axial direction (direction of the central axial line C of the bowl 4 and bowl hub 6) from a proximal end portion of the flange 11 inside the bowl 4, and a cylindrical outer shaft 13 protruding in the axial direction outside the bowl 4. The outer shaft 13 of the bowl hub 6 is rotatably supported by a bowl hub bearing 7 inside a cylindrical holder 14. The holder 14 holds in the center thereof a raw liquid supply pipe 2 for supplying raw liquid to be processed from outside the device into the bowl 4, and the holder 14 and the raw liquid supply pipe 2 are fixed to the installation surface of the decanter-type centrifugal separator 1.

A screw conveyor 5 is constituted by a conveyor hub 8 and a spiral flight 9 attached to the outer circumferential surface of the conveyor hub 8. The conveyor hub 8 is supported coaxially with the bowl 4 and the bowl hub 6 in a state in which the end section of the conveyor hub 8 can rotate on a conveyor hub bearing 10 radially outside the inner shaft 12 of the bowl hub 6. The screw conveyor 5 is configured to be rotatable at a speed different from that of the bowl 4 by transmitting a rotational drive force from a drive means via a differential gear (not shown in the figure).

A lubricant supply path 17 and a lubricant discharge path 21 are formed inside the bowl hub 6. Among them, the lubricant supply path 17 serves to supply continuously the lubricant (grease or other lubricant) to the conveyor hub bearing 10 and is constituted by a first vertical orifice 18 drilled inward from the outer circumferential surface of the outer shaft 13 of the bowl hub 6, a second vertical orifice 19 drilled inward from the outer circumferential surface of the inner shaft 12, and a transverse orifice 20 passing from the bottom of the first vertical orifice 18 to the bottom of the second vertical orifice 19.

Meanwhile, the lubricant discharge path 21 serves to discharge the lubricant supplied to the conveyor hub bearing 10 and is constituted by a first vertical orifice 22 drilled inward from the outer circumferential surface of the outer shaft 13 of the bowl hub 6, a second vertical orifice 23 drilled inward from the outer circumferential surface of the inner shaft 12, and a transverse orifice 24 passing from the bottom of the first vertical orifice 22 to the bottom of the second vertical orifice 23.

The first vertical orifice 18 of the lubricant supply path 17 and the first vertical orifice 22 of the lubricant discharge path 21 are formed in a section of the outer shaft 13 that is inserted into the holder 14. The second vertical orifice 19 of the lubricant supply path 17 and the second vertical orifice 23 of the lubricant discharge path 21 are formed in a section of the inner shaft 12 that is close to the conveyor hub bearing 10.

The transverse orifice 20 of the lubricant supply path 17 and the transverse orifice 24 of the lubricant discharge path 21 extend in the axial line direction (direction of the central axial line C of the bowl 4 and the bowl hub 6) from the outer shaft 13 toward the inner shaft 12. However, the transverse orifices 20, 24 are not parallel to the central axial line C. Thus, the transverse orifice 20 of the lubricant supply path 17 is formed such that the distance thereof from the central axial line C increases gradually from the end portion at the first vertical orifice 18 side toward the end portion at the second vertical orifice 19 side, that is, so that the second vertical orifice 19 side (final end side) is tilted radially outward with respect to the first vertical orifice 18 side (starting end side). Further, the transverse orifice 24 of the lubricant discharge path 21 is formed such that the distance thereof from the central axial line C increases gradually from the end portion at the second vertical orifice 23 side toward the end portion at the first vertical orifice 22 side, that is, so that the first vertical orifice 22 side (final end side) is tilted radially outward with respect to the second vertical orifice 23 side (starting end side).

Two parallel annular grooves (a first annular groove 15 and a second annular groove 16) that recede to a predetermined depth radially outward from the inner circumferential surface are formed inside the holder 14. The first annular groove 15 is closed from the inside by the outer circumferential surface 13a of the outer shaft 13 inserted into the holder 14 and constitutes an annular introducing path 25 for introducing the lubricant from the holder 14 into the lubricant supply path 17 located inside the outer shaft 13. The annular introducing path 25 communicates with a lubricant injection path 30 formed inside the holder 14 and makes it possible to inject the lubricant from the outside of the holder 14 into the annular introducing path 25 via the lubricant injection path 30.

The second annular groove 16 is closed from the inside by the outer circumferential surface 13b of the outer shaft 13 and constitutes an annular collection section 26 for collecting and discharging the lubricant released from the lubricant discharge path 21 located inside the outer shaft 13. The annular collection section 26 communicates with a lubricant outflow path 31 formed inside the holder 14, and the lubricant is discharged from the interior of the annular collection section 26 to the outside of the holder 14 via the lubricant outflow path 31.

Figure 2:
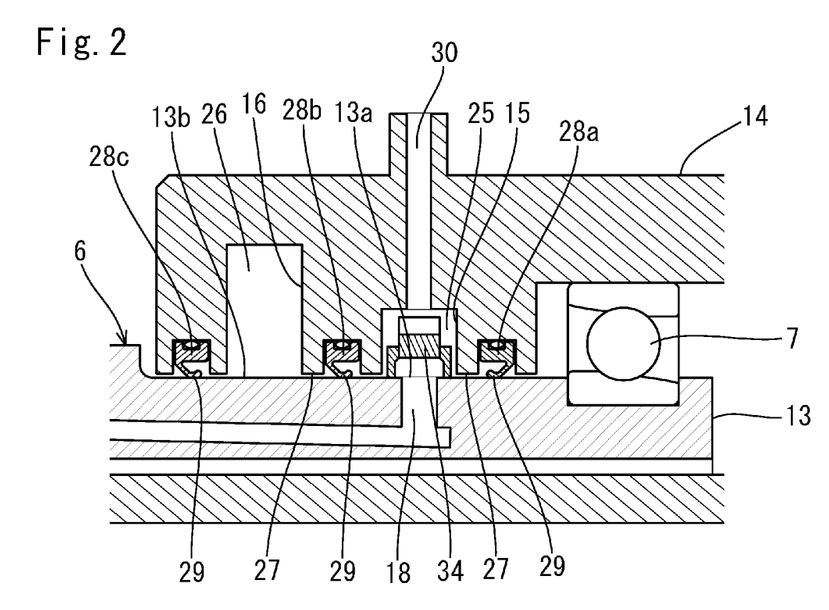
FIG. 2 is an enlarged cross-sectional view of the outer shaft 13 and the holder 14 of the decanter-type centrifugal separator 1 shown in FIG. 1.

Since a gap 27 is present, as shown in FIG. 2 (enlarged cross-sectional view of the outer shaft 13 and the holder 14), between the inner circumferential surface of the holder 14 and the outer circumferential surface of the outer shaft 13 of the bowl hub 6, although the first annular groove 15 and the second annular groove 16 are closed by the outer circumferential surfaces 13a, 13b of the outer shaft 13, those annular grooves 15, 16 are not closed tightly. Therefore, where the lubricant flows into the first annular groove 15 and the second annular groove 16 in this state, the lubricant leaks through the gap 27.

In the present embodiment, three oil seals (holder-side oil seals 28a to 28c) are disposed adjacently to the first annular groove 15 and the second annular groove 16, thereby advantageously preventing the lubricant from leaking from the gap 27. More specifically, the holder-side oil seals 28a to 28c are contact-type seal rings, the outer circumferential side thereof is attached closely and fixed over the entire circumference to the holder 14, a lip section 29 on the inner circumferential side is in contact over the entire circumference with the outer circumferential surface of the outer shaft 13, and the gaps 27 at both sides of the annular introducing path 25 are tightly closed by the holder-side oil seal 28a disposed adjacently to the right side (right side in FIG. 2) (distal end side of the outer shaft 13) of the first annular groove 15 and by the holder-side oil seal 28b disposed adjacently to the left side (proximal end side of the outer shaft 13) of the first annular groove 15. Further, the gaps 27 at both sides of the annular collection section 26 are tightly closed by the holder-side oil seal 28b disposed adjacently to the right side (distal end side of the outer shaft 13) of the second annular groove 16 and by the holder-side oil seal 28c disposed adjacently to the left side (proximal end side of the outer shaft 13) of the second annular groove 16.

The annular introducing path 25 communicates with the lubricant supply path 17, and the annular collection section 26 communicates with the lubricant discharge path 21. More specifically, as shown in FIG. 1, the first vertical orifice 18 of the lubricant supply path 17 is open in a section (outer circumferential surface 13a) of the outer circumferential surface of the outer shaft 13 that closes the first annular groove 15. The first vertical orifice 22 of the lubricant discharge path 21 is open in a section (outer circumferential surface 13b) of the outer circumferential surface of the outer shaft 13 that closes the second annular groove 16. An oil collector 34 is attached around the opening (opening of the lubricant supply path 17 on the outer shaft 13 side) of the first vertical orifice 18 of the lubricant supply path 17 in the outer circumferential surface 13a, and an oil deflector 35 is attached around the opening of the first vertical orifice 22 of the lubricant discharge path 21 in the outer circumferential surface 13b.

Figure 3:
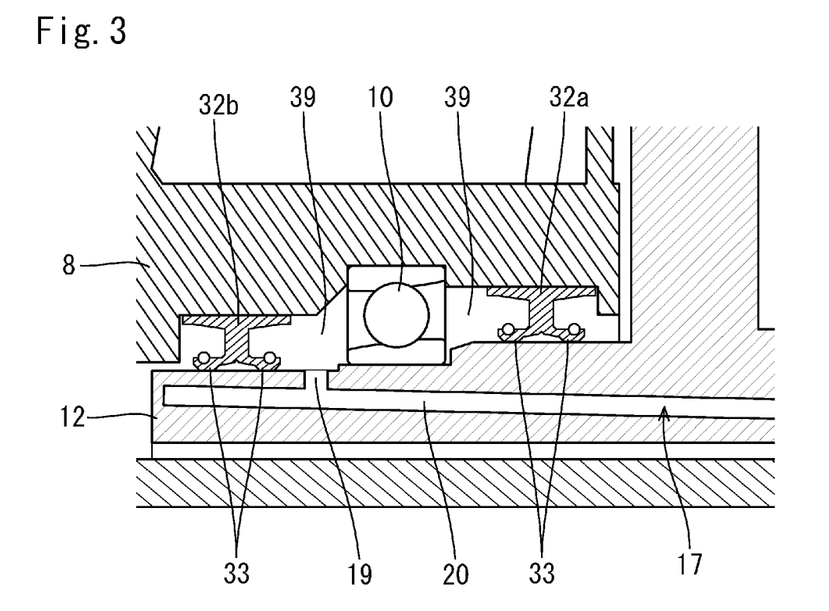
FIG. 3 is an enlarged cross-sectional view of the conveyor hub 8 and the inner shaft 12 of the decanter-type centrifugal separator 1 shown in FIG. 1.

Meanwhile, conveyor-hub-side oil seals 32a, 32b are also disposed between the conveyor hub 8 and the inner shaft 12 of the bowl hub 6. The conveyor-hub-side oil seals 32a, 32b are also contact-type seal rings, the outer circumferential side thereof is attached closely and fixed over the entire circumference to the inner circumferential surface of the conveyor hub 8, and a lip section 33 on the inner circumferential side is in contact over the entire circumference with the outer circumferential surface of the inner shaft 12 (see FIG. 3). As a result of disposing such conveyor-hub-side oil seals 32a, 32b, a closed annular space 39 is formed between the conveyor hub 8 and the inner shaft 12 of the bowl hub 6. The conveyor hub bearing 10 is disposed in the intermediate position of the annular space 39 between those conveyor-hub-side oil seals 32a, 32b.

As shown in FIG. 1, the annular space 39 communicates with the lubricant supply path 17 and the lubricant discharge path 21. More specifically, the second vertical orifice 19 of the lubricant supply path 17 is open in a section of the outer circumferential surface of the inner shaft 12 between one conveyor-hub-side oil seals 32b and the conveyor bearing 10, and the second vertical orifice 23 of the lubricant discharge path 21 is open in a section of the outer circumferential surface of the inner shaft 12 between the other conveyor-hub-side oil seals 32a and the conveyor bearing 10.

In the decanter-type centrifugal separator 1 in accordance with the present invention, the continuous lubricant supply device constituted by the lubricant injection path 30, annular introducing path 25, holder-side oil seals 28a to 28c, oil collector 34, lubricant supply path 17, annular space 39, conveyor-hub-side oil seals 32a, 32b, lubricant discharge path 21, annular collection section 26, oil deflector 35, and lubricant outflow path 31, from among the constituent components described hereinabove, makes it possible to supply the lubricant continuously and stably to the conveyor hub bearing 10, without stopping the operation, that is, while the bowl 4 and the screw conveyor 5 rotate at a high speed.

Explained below is a method for continuously supplying the lubricant to the conveyor hub bearing 10 and discharging the lubricant therefrom with the continuous lubricant supply device in the decanter-type centrifugal separator 1 in accordance with the present invention. First, a lubricant supply means is connected to the lubricant injection path 30, and the lubricant is injected into the lubricant injection path 30 under a predetermined pressure.

Figure 4:
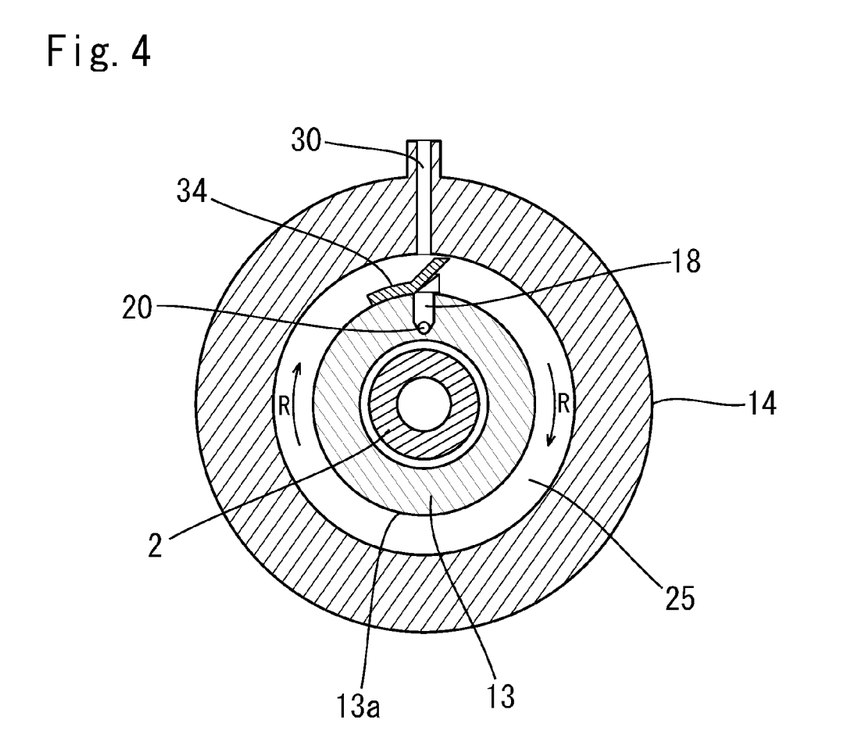
FIG. 4 is a cross-sectional view of the holder 14 and the outer shaft 13 taken along the 4-4 line in FIG. 1.

The lubricant injected into the lubricant injection path 30 flows inside the annular introducing path 25. In this case, the outer shaft 13 located inside the annular introducing path 25 rotates at a high speed, and the oil collector 34 attached to the outer circumferential surface 13a thereof revolves at a high speed in the direction of arrow R shown in FIG. 4 (cross-sectional view of the holder 14 and the outer shaft 13 taken along the 4-4 line in FIG. 1) along a trajectory inside the annular introducing path 25.

Figure 5:
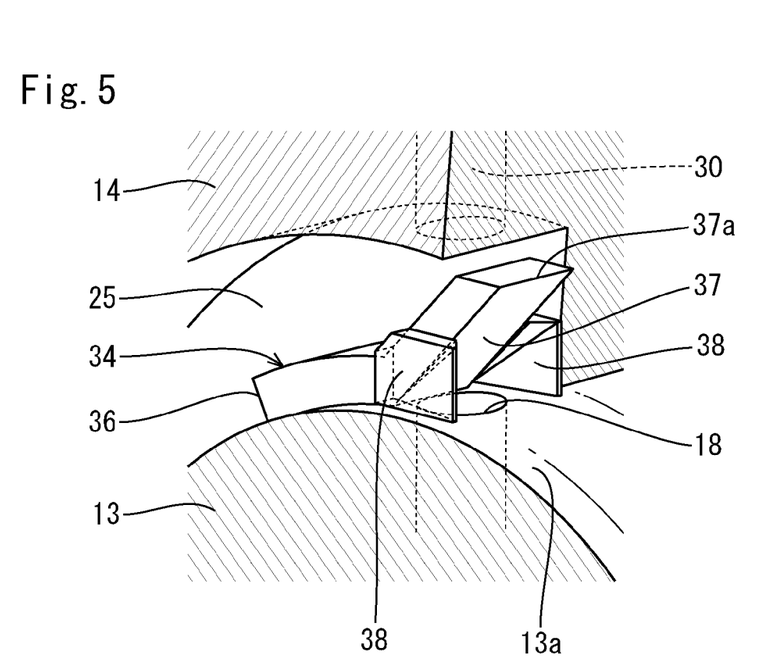
FIG. 5 is an enlarged perspective view of the oil collector 34 shown in FIG. 4.

As shown in FIG. 5 (enlarged perspective view of the oil collector 34 shown in FIG. 4), the oil collector 34 is constituted by a base section 36, a center flap 37, and two side flaps 38. The base section 36 is fixed by bolts or the like (not shown in the figure) to the outer circumferential surface 13a of the outer shaft 13. The center flap 37 is in a state such that a distal end section 37a thereof is tilted forward (forward in the rotation direction of the outer shaft 13 and the oil collector 34) and covers the top (radially outer side) of the opening of the first vertical orifice 18 from the rear side in the rotation direction.

The two side flaps 38 are fixed to two sides of the center flap 37 and surround the opening of the first vertical orifice 18 from both sides. The two side flaps 38 are configured such that the distance therebetween increases gradually forward in the rotation direction, that is, so that the distance between the side flaps at the front side is larger than at the rear side.

Since the center flap 37 of the oil collector 34 assumes a posture that is tilted forward, the center flap 37 revolving at a high speed causes the lubricant located inside the annular introducing path 25 to move radially inward. Since the first vertical orifice 18 is open radially inward of the center flap 37, the lubricant flows into the first vertical orifice 18. Further, the lubricant located inside the annular introducing path 25 is efficiently collected by the side flaps 38, which expands at the front side, in a region around the first vertical orifice 18, and the lubricant can be caused to flow into the first vertical orifice 18 with sufficient intensity against the centrifugal force. Therefore, it is not necessary to increase the pressure for supplying the lubricant, as in the continuous lubricant supply device used in the conventional decanter centrifugal separator, and by using the contact-type seal rings as the holder-side oil seals 28a to 28c it is possible to expect the effect of preventing the lubricant from leaking from the gap 27.

The lubricant that has flown into the first vertical orifice 18 is pushed out by the lubricant following thereafter and flows into the transverse orifice 20 of the lubricant supply path 17 shown in FIG. 1. The transverse orifice 20 is formed such as to separate gradually from the central axial line C from the end on the first vertical orifice 18 side to the end on the second vertical orifice 19 side, as mentioned hereinabove, that is, such that the second vertical orifice 19 side tilts radially outward with respect to the first vertical orifice 18 side. Therefore, the lubricant that has flown into the transverse orifice 20 is assisted by a centrifugal force in addition to a push-out force of the lubricant following thereafter and moves smoothly toward the second vertical orifice 19 side.

The lubricant that has flown down inside the transverse orifice 20 and reached the second vertical orifice 19 flows from the second vertical orifice 19 into the annular space 39 between the conveyor-hub-side oil seals 32a, 32b (region between the conveyor hub bearing 10 and the conveyor-hub-side oil seal 32b) and is supplied to the conveyor hub bearing 10.

The lubricant that has been supplied into the conveyor hub bearing 10 is pushed out by the lubricant following thereafter, flows down into the region on the opposite side inside the annular space 39 (region between the conveyor hub bearing 10 and the conveyor-hub-side oil seal 32a), then successively flows down through the second vertical orifice 23 and the transverse orifice 24 of the lubricant discharge path 21, and is then released from the opening of the first vertical orifice 22, collected in the annular collection section 26, and discharged to the outside from the lubricant outflow path 31.

As described hereinabove, the transverse orifice 24 is formed such as to separate gradually from the central axial line C from the end on the second vertical orifice 23 side to the end on the first vertical orifice 22 side, that is, such that the first vertical orifice 22 side tilts radially outward with respect to the second vertical orifice 23 side. Therefore, the lubricant that has flown into the transverse orifice 24 from the second vertical orifice 23 is assisted by a centrifugal force in addition to a push-out force created by the lubricant following thereafter and moves smoothly toward the first vertical orifice 22 side.

Further, the oil deflector 35 is attached around the opening of the first vertical orifice 22 in the outer circumferential surface 13b (surface facing the annular collection section 26 inside the holder 14) of the outer shaft 13. This oil deflector 35 has a size and shape same as those of the oil collector 34 (see FIG. 4 and FIG. 5) revolving inside the annular introducing path 25 and, similarly to the oil collector 34, revolves at a high speed along a trajectory following the outer circumferential surface of the outer shaft 13 inside the annular collection section 26. However, the attachment orientation related to the revolution direction is directly opposite to that of the oil collector 34. More specifically, in the oil deflector 35, the distal end section of the center flap is attached to the outer circumferential surface 13b with orientation such as to be tilted in the direction opposite to the rotation direction and cover the top (radial outer side) of the opening of the first vertical orifice 22 from the front side in the rotation direction.

In the oil deflector 35, the distal end section of the center flap is tilted rearward of the rotation direction, demonstrates an action of moving the discharged lubricant smoothly toward the lubricant outflow path 31 by rotation and has a shape that covers the top of the opening of the first vertical orifice 22 from the front side in the rotation direction. Therefore, the effect of smoothly moving the lubricant discharged from the opening of the first vertical orifice 22 into the lubricant outflow path 31, without offering any resistance to the lubricant that is pushed out from the rear side thereof, can be expected.

In the present embodiment, contact-type seal rings are used as the holder-side oil seals 28a to 28c. Therefore, when the decanter-type centrifugal separator 1 is operated, the temperature of contact portions (lip section 29 and the outer circumferential surface of the outer shaft 13 rotating at a high speed) is raised by friction heat. As a result, it is preferred that heat-resistant oil seals formed from a heat-resistant material (for example, PTFE (polytetrafluoroethylene) filled with a polyimide) be used as the holder-side oil seals 28a to 28c. When heat-resistance seal rings are not used, it is highly probable that the lip section 29 that is in contact with the outer shaft 13 will burn.

It is preferred that an air supply means, in addition to the lubricant supply means, be connected to the lubricant injection path 30. In this case, when the lubricant is injected from the lubricant supply means into the lubricant injection path 30, air can be injected under a predetermined pressure together with the lubricant and can be caused to flow down successively through the lubricant supply route and discharge route (annular introducing path 25, lubricant supply path 17, annular space 39, lubricant discharge path 21, and annular collection section 26) thereby making it possible to supply the injected lubricant more smoothly to the conveyor hub bearing 10 and smoothly discharge the injected lubricant.

Further, when the air injected from the air supply means is caused to flow continuously down inside the lubricant supply route and discharge route, the holder-side oil seals 28a to 28c and the outer shaft 13 that were heated by friction can be advantageously cooled. Therefore, even when it is not necessary to supply the lubricant to the conveyor hub bearing 10, it is preferred that the air be continuously injected and caused to flow down inside the lubricant supply route and discharge route in order to cool the holder-side oil seals 28a to 28c and the outer shaft 13.

Further, in the present embodiment, the annular introducing path 25 for introducing the lubricant injected from outside the holder 14 into the lubricant supply path 17, and the annular collection section 26 for discharging the lubricant from the lubricant discharge path 21 are constituted by the first annular groove 15 and the second annular groove 16 formed inside the holder 14 and the outer circumferential surfaces 13a, 13b of the outer shaft 13 closing those annular grooves 15, 16 from the inside, but the annular introducing path 25 and the annular collection section 26 can be also configured by the first annular groove 15 and the second annular groove 16 formed at the respective outer shaft 13 sides and the inner circumferential surface of the holder 14 closing the annular grooves 15, 16 from the outside.

Further, in the present embodiment, an example is explained in which the continuous lubricant supply device is applied to the bowl hub 6 and the holder 14 on the rear side of the decanter-type centrifugal separator 1, but the continuous lubricant supply device can be also applied to the bowl hub and holder on the front side. Furthermore, in the present embodiment, ball bearings are used as the bowl hub bearing 7 and the conveyor hub bearing 10, but roller bearings, sliding bearings, or other bearings can be also used.

In addition seal rings in which the lip section 29 (33) is formed on the inner circumferential side, the outer circumferential side is attached closely and fixed over the entire circumference to the holder 14 (conveyor hub 8), and the lip section 29 (33) on the inner circumferential side is in contact over the entire circumference with the outer circumferential surface of the outer shaft 13 (inner shaft 12) are used as the holder-side oil seals 28a to 28c (and the conveyor-hub-side oil seals 32a, 32b), but oil seals in which the lip section is formed on the outer circumferential side, the inner circumferential side attached closely and fixed over the entire circumference to the outer circumferential surface of the outer shaft 13 (inner shaft 12), and the lip section on the outer circumferential side is in contact over the entire circumference with the holder 14 (conveyor hub 8) can be used, and seal rings of a type in which the lip section protrudes sidewise, rather than being located on the outer circumferential side or inner circumferential side, can be also used.

DESCRIPTION OF THE REFERENCE NUMERALS 1, 51 decanter-type centrifugal separator
2, 52 raw liquid supply pipe
4, 54 bowl
5, 55 screw conveyor
6, 56F, 56R bowl hub
7, 57F, 57R bowl hub bearing
8, 58 conveyor hub
9, 59 flight
10, 60F, 60R conveyor hub bearing
11 flange
12, 62F, 62R inner shaft
13, 63F, 63R outer shaft
13a, 13b outer circumferential surface
14 holder
15 first annular groove
16 second annular groove
17 lubricant supply path
18 first vertical orifice
19 second vertical orifice
20 transverse orifice
21 lubricant discharge path
22 first vertical orifice
23 second vertical orifice
24 transverse orifice
25 annular introducing path
26 annular collection section
27 gap
28a, 28b, 28c holder-side oil seal
29 lip section
30 lubricant injection path
32 lubricant outflow path
32a, 32b conveyor-hub-side oil seal
33 lip section
34 oil collector
35 oil deflector
36 base section
37 center flap
37a distal end section
38 side flap
39 annular space
61 differential gear

The invention claimed is:

1. A decanter-type centrifugal separator comprising:
a hollow bowl;
a bowl hub supporting the hollow bowl, said bowl hub comprising a flange, an inner shaft, and an outer shaft;
a holder supporting in a rotatable state the outer shaft of the bowl hub inserted inside the holder; and
a conveyor hub bearing supporting a screw conveyor in a rotatable state at an outer circumferential side of the inner shaft of the bowl hub, the screw conveyer being configured such that a to-be-processed raw liquid, introduced into the hollow bowl, is separated by a centrifugal force into fractions, and the separated fractions are discharged separately due to high speed rotations of the outer shaft and the screw conveyor,
wherein the decanter-type centrifugal separator further comprises a continuous lubricant supply device including:
a lubricant supply path inside the bowl hub along which a lubricant is continuously supplied to the conveyor hub bearing;
an annular introducing path along which the lubricant is introduced into the lubricant supply path;
a lubricant injection path inside the holder along which the lubricant can be injected from outside the holder into the annular introducing path; and
an oil collector attached to an outer circumferential surface of the outer shaft,
the annular introducing path comprising a first annular groove inside the holder formed radially outward from an inner circumferential surface thereof, such that an outer circumferential surface of the outer shaft closes the first annular groove from an inner side, and
the oil collector is configured to revolve in a predetermined direction along a trajectory inside the annular introducing path, thereby collecting the lubricant located inside the annular introducing path, moving the lubricant to a region on a radially inner side of the annular introducing path, and causing the lubricant to flow into the lubricant supply path formed at a position on a radial inner side of the oil collector.

2. The decanter-type centrifugal separator according to claim 1, wherein contact-type heat-resistant oil seals, attached closely and fixed over an entire circumference of the holder, are disposed at both sides of the first annular groove, such that any gap between an inner circumferential surface of the holder and the outer circumferential surface of the outer shaft of the bowl hub is closed, the contact-type heat-resistant oil seals comprising lip sections in contact over an entire circumference with the outer shaft.

3. The decanter-type centrifugal separator according to claim 1, wherein contact-type heat-resistant oil seals, attached closely and fixed over an entire circumference to the outer shaft, are disposed at both sides of the first annular groove, such that any gap between an inner circumferential surface of the holder and the outer circumferential surface of the outer shaft of the bowl hub is closed, the contact-type heat-resistant oil seals comprising lip sections in contact over an entire circumference with the holder.

4. The decanter-type centrifugal separator according to claim 1, wherein the oil collector comprises a base section and a center flap,
the base section is fixed to the outer circumferential surface of the outer shaft of the bowl hub, and
the center flap is fixed such that a distal end section thereof is tilted forward in a rotation direction of the outer shaft, and covers a top of an opening of the lubricant supply path on an outer shaft side from a rear side in the rotation direction.

5. The decanter-type centrifugal separator according to claim 4, wherein
the oil collector further comprises two side flaps, the side flaps are attached to two respective sides of the center flap and fixed so as to surround the opening of the lubricant supply path on the outer shaft side from the sides.

6. The decanter-type centrifugal separator according to claim 5, wherein the two side flaps are configured such that a distance therebetween increases gradually forward in the rotation direction of the outer shaft.

7. The decanter-type centrifugal separator according to claim 1, wherein the continuous lubricant supply device comprises:
a lubricant discharge path inside the bowl hub along which the lubricant supplied to the conveyor hub bearing is discharged;
an annular collection section for collecting and discharging the lubricant released from the lubricant discharge path; and
a lubricant outflow path inside the holder along which a discharge of the lubricant from the annular collection section to the outside of the holder is enabled,
the annular collection section comprises a second annular groove inside the holder formed radially outward from the inner circumferential surface thereof, such that the outer circumferential surface of the outer shaft closes the second annular groove from the inner side.

8. The decanter-type centrifugal separator according to claim 7, wherein contact-type heat-resistant oil seals, attached closely and fixed over an entire circumference of the holder, are disposed at both sides of the second annular groove, such that any gap between an inner circumferential surface of the holder and the outer circumferential surface of the outer shaft of the bowl hub is closed, the contact-type heat-resistant oil seals comprising lip sections in contact over an entire circumference with the outer shaft.

9. The decanter-type centrifugal separator according to claim 7, wherein contact-type heat-resistant oil seals, attached closely and fixed over an entire circumference to the outer shaft, are disposed at both sides of the second annular groove, such that any gap between an inner circumferential surface of the holder and the outer circumferential surface of the outer shaft of the bowl hub is closed, the contact-type heat-resistant oil seals comprising lip sections in contact over an entire circumference with the holder.

10. The decanter-type centrifugal separator according to claim 7, wherein the lubricant discharge path comprises:
a first vertical orifice formed in the outer shaft of the bowl hub;
a second vertical orifice formed in the inner shaft of the bowl hub; and
a transverse orifice connecting a bottom of the first vertical orifice with a bottom of the second vertical orifice, the transverse orifice formed such that a final end side is tilted radially outward with respect to a starting end side.

11. The decanter-type centrifugal separator according to claim 1, wherein the lubricant supply path comprises:
a first vertical orifice formed in the outer shaft of the bowl hub;
a second vertical orifice formed in the inner shaft of the bowl hub; and
a transverse orifice connecting a bottom of the first vertical orifice with a bottom of the second vertical orifice, the transverse orifice formed such that a final end side is tilted radially outward with respect to a starting end side.

12. The decanter-type centrifugal separator according to claim 1, wherein a lubricant supply device and an air supply device are connected to the lubricant injection path, such that air can flow downward in the lubricant injection path and the annular introducing path.

13. A decanter-type centrifugal separator comprising:
a hollow bowl;
a bowl hub supporting the hollow bowl, said bowl hub comprising a flange, an inner shaft, and an outer shaft;
a holder supporting in a rotatable state the outer shaft of the bowl hub inserted inside the holder; and
a conveyor hub bearing supporting a screw conveyor in a rotatable state at an outer circumferential side of the inner shaft of the bowl hub, the screw conveyer being configured such that a to-be-processed raw liquid, introduced into the hollow bowl, is separated by a centrifugal force into fractions, and the separated fractions are discharged separately due to high speed rotations of the outer shaft and the screw conveyor,
wherein the decanter-type centrifugal separator further comprises a continuous lubricant supply device including:
a lubricant supply path inside the bowl hub along which a lubricant is continuously supplied to the conveyor hub bearing;
an annular introducing path along which the lubricant is introduced into the lubricant supply path;
a lubricant injection path inside the holder along which the lubricant can be injected from outside the holder into the annular introducing path; and
an oil collector attached to the outer shaft,
the annular introducing path comprising a first annular groove formed radially inward from an outer circumferential surface of the outer shaft such that an inner circumferential surface of the holder closes the first annular groove from an outer side, and
the oil collector is configured to revolve in a predetermined direction along a trajectory inside the annular introducing path, thereby collecting the lubricant located inside the annular introducing path, moving the lubricant to a region on a radially inner side of the annular introducing path, and causing the lubricant to flow into the lubricant supply path formed at a position on a radial inner side of the oil collector.

14. The decanter-type centrifugal separator according to claim 13, wherein contact-type heat-resistant oil seals, attached closely and fixed over an entire circumference of the holder, are disposed at both sides of the first annular groove, such that any gap between an inner circumferential surface of the holder and the outer circumferential surface of the outer shaft of the bowl hub is closed, the contact-type heat-resistant oil seals comprising lip sections in contact over an entire circumference with the outer shaft.

15. The decanter-type centrifugal separator according to claim 13, wherein contact-type heat-resistant oil seals, attached closely and fixed over an entire circumference to the outer shaft, are disposed at both sides of the first annular groove, such that any gap between an inner circumferential surface of the holder and the outer circumferential surface of the outer shaft of the bowl hub is closed, the contact-type heat-resistant oil seals comprising lip sections in contact over an entire circumference with the holder.

16. The decanter-type centrifugal separator according to claim 13, wherein the oil collector comprises a base section and a center flap,
    the base section is fixed to the outer circumferential surface of the outer shaft of the bowl hub, and
    the center flap is fixed such that a distal end section thereof is tilted forward in a rotation direction of the outer shaft, and covers a top of an opening of the lubricant supply path on an outer shaft side from a rear side in the rotation direction.

17. The decanter-type centrifugal separator according to claim 16, wherein
    the oil collector further comprises two side flaps, the side flaps are attached to two respective sides of the center flap and fixed so as to surround the opening of the lubricant supply path on the outer shaft side from the sides.

18. The decanter-type centrifugal separator according to claim 17, wherein the two side flaps are configured such that a distance therebetween increases gradually forward in the rotation direction of the outer shaft.

19. The decanter-type centrifugal separator according to claim 13, wherein the continuous lubricant supply device comprises:
    a lubricant discharge path inside the bowl hub along which the lubricant supplied to the conveyor hub bearing is discharged;
    an annular collection section for collecting and discharging the lubricant released from the lubricant discharge path; and
    a lubricant outflow path inside the holder along which a discharge of the lubricant from the annular collection section to the outside of the holder is enabled,
    the annular collection section comprises a second annular groove formed radially inward from the outer circumferential surface of the outer shaft such that the inner circumferential surface of the holder closes the second annular groove from the outer side.

20. The decanter-type centrifugal separator according to claim 19, wherein contact-type heat-resistant oil seals, attached closely and fixed over an entire circumference of the holder, are disposed at both sides of the second annular groove, such that any gap between an inner circumferential surface of the holder and the outer circumferential surface of the outer shaft of the bowl hub is closed, the contact-type heat-resistant oil seals comprising lip sections in contact over an entire circumference with the outer shaft.

21. The decanter-type centrifugal separator according to claim 19, wherein contact-type heat-resistant oil seals, attached closely and fixed over an entire circumference to the outer shaft, are disposed at both sides of the second annular groove, such that any gap between an inner circumferential surface of the holder and the outer circumferential surface of the outer shaft of the bowl hub is closed, the contact-type heat-resistant oil seals comprising lip sections in contact over an entire circumference with the holder.

22. The decanter-type centrifugal separator according to claim 19, wherein the lubricant discharge path comprises:
    a first vertical orifice formed in the outer shaft of the bowl hub;
    a second vertical orifice formed in the inner shaft of the bowl hub; and
    a transverse orifice connecting a bottom of the first vertical orifice with a bottom of the second vertical orifice, the transverse orifice formed such that a final end side is tilted radially outward with respect to a starting end side.

23. The decanter-type centrifugal separator according to claim 13, wherein the lubricant supply path comprises:
    a first vertical orifice formed in the outer shaft of the bowl hub;
    a second vertical orifice formed in the inner shaft of the bowl hub; and
    a transverse orifice connecting a bottom of the first vertical orifice with a bottom of the second vertical orifice, the transverse orifice formed such that a final end side is tilted radially outward with respect to a starting end side.

24. The decanter-type centrifugal separator according to claim 13, wherein a lubricant supply device and an air supply device are connected to the lubricant injection path, such that air can flow downward in the lubricant injection path and the annular introducing path.

* * * * *